Feb. 5, 1924.
B. F. FITCH
1,482,604
REMOVABLE AUTOMOBILE BODY
Filed June 28, 1920     4 Sheets-Sheet 1
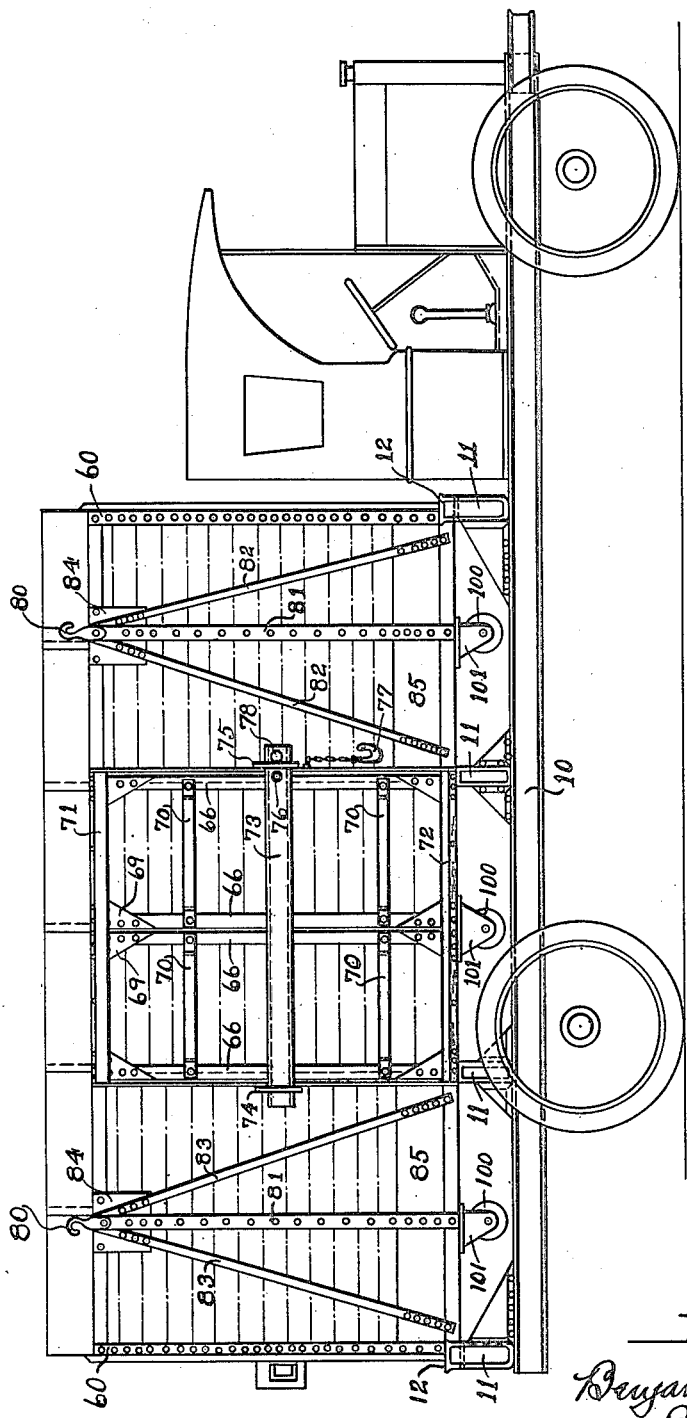
Inventor
Benjamin F. Fitch.
By Baker & Moehlis,
Attorneys

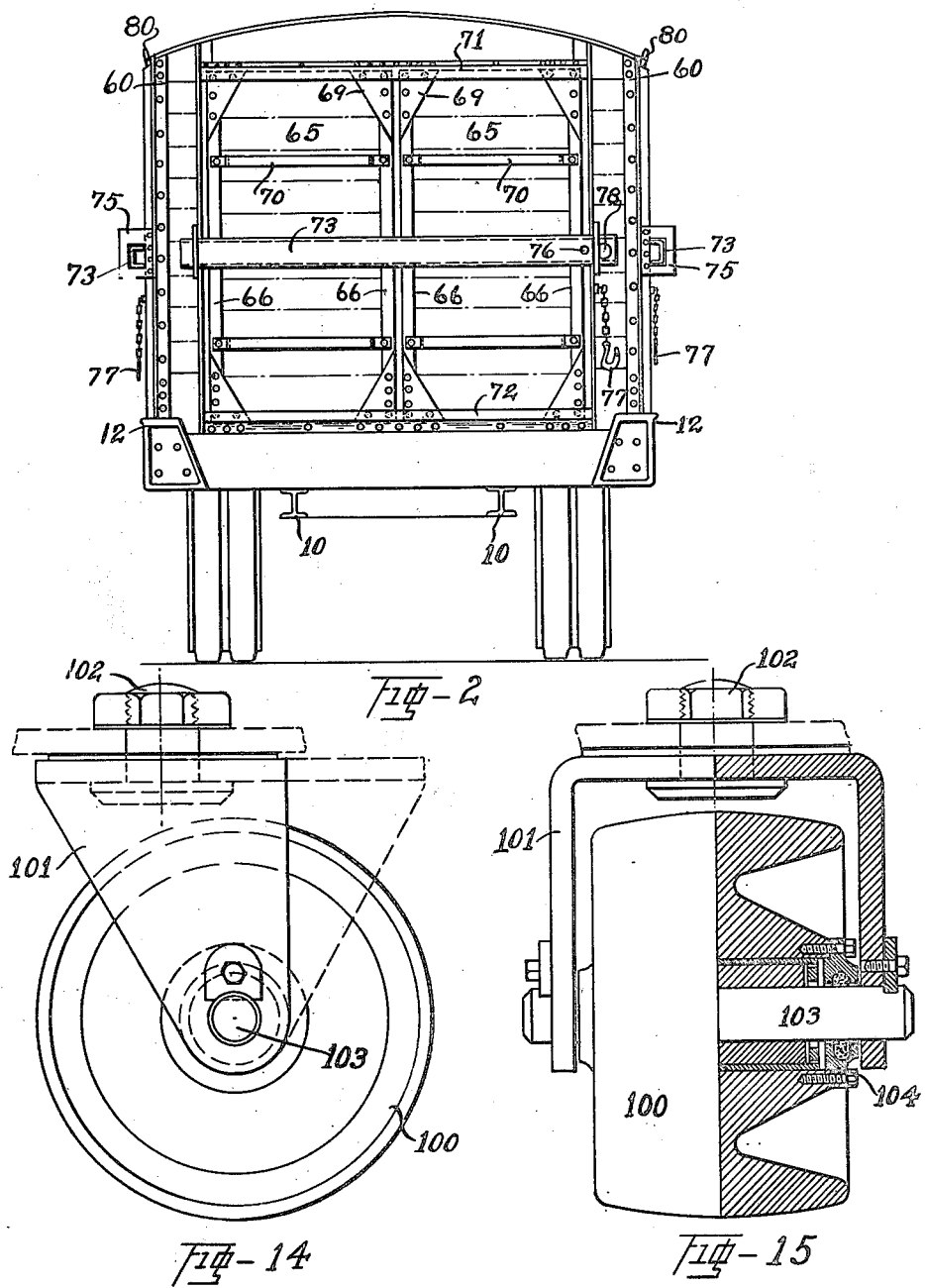

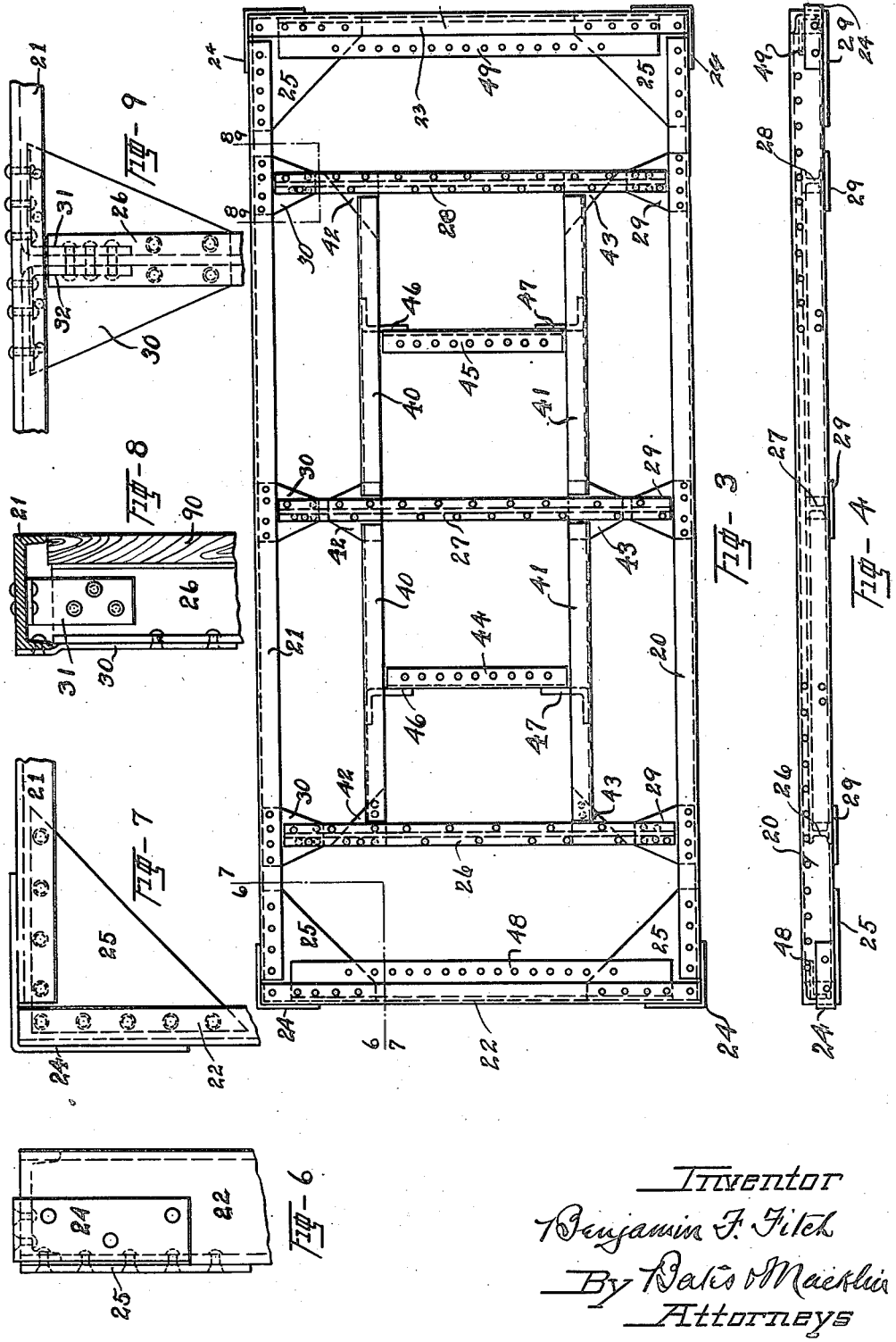

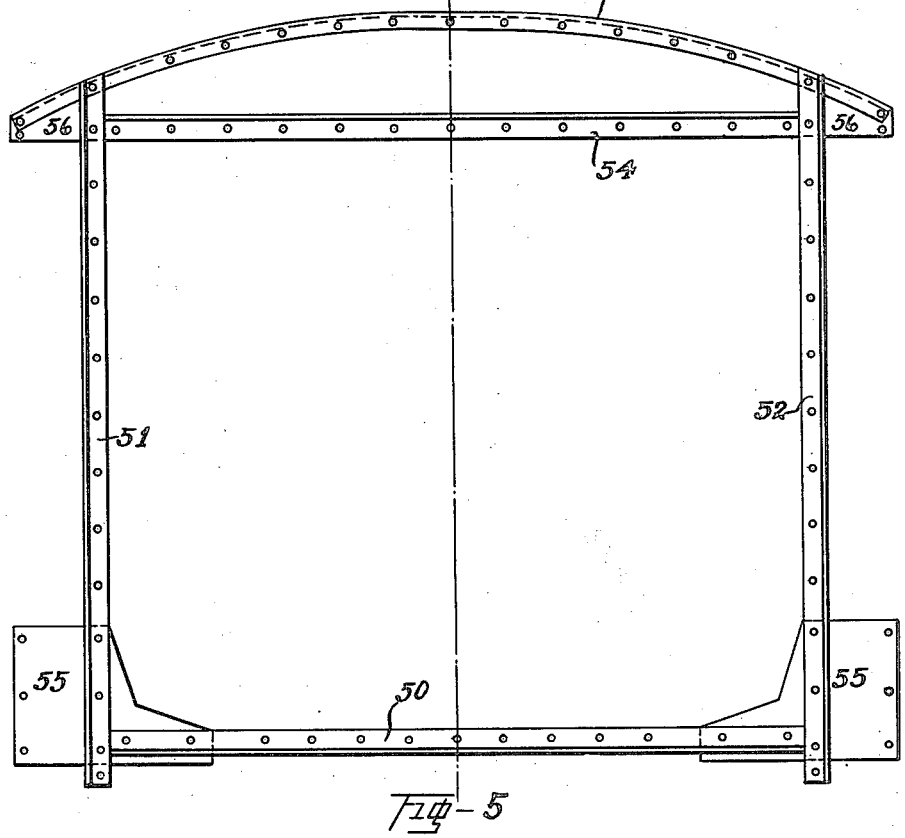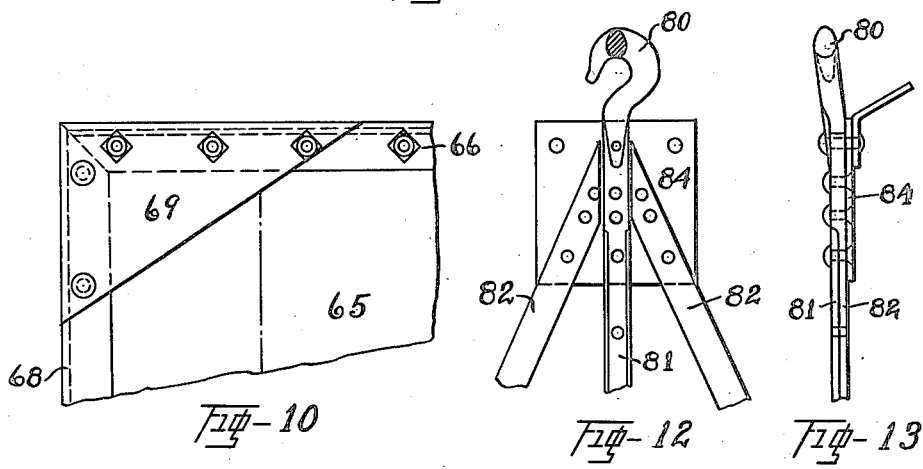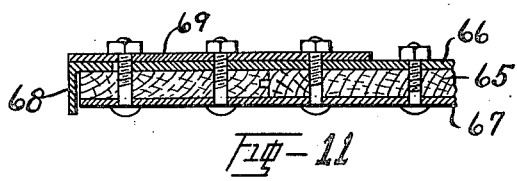

Patented Feb. 5, 1924.

1,482,604

UNITED STATES PATENT OFFICE.

BENJAMIN F. FITCH, OF EVANSTON, ILLINOIS.

REMOVABLE AUTOMOBILE BODY.

Application filed June 28, 1920. Serial No. 392,337.

*To all whom it may concern:*

Be it known that I, BENJAMIN F. FITCH, a citizen of the United States, residing at Evanston, in the county of Cook and State of Illinois, have invented a certain new and useful Improvement in Removable Automobile Bodies, of which the following is a full, clear, and exact description, reference being had to the accompanying drawings.

This invention relates to removable automobile bodies for use in freight transfer and transportation systems. An object is to provide such a construction that the bodies will be well adapted for use in transporating freight, where the body is frequently lifted from a truck and placed on platforms for loading freight therein. Another feature to be attained is safe use for heavy loads and long hauls. My invention may be used in connection with such systems as shown, described and claimed in my Patent No. 1,275,-145, issued August 6, 1918.

A more specific object of my invention is to provide a truck body which has the characteristics of lightness in weight combined with strength and rigidity of construction, whereby heavy loads may be lifted from a platform to a truck body and removed therefrom without distorting or buckling the body or subjecting it to undue stress. Still another object of my invention is to so proportion the body that it may be placed either upon a truck and be transported through the streets of a city or over roads for long hauls, or upon a flat railroad car and be transported upon standard railroad equipment.

For accomplishing the above objects I provide a body having a fabricated rigid base and sides, with the parts so related that any lifting strain on the sides of the body is distributed to the base. I also provide suitable engaging means, such as hooks, on the sides of the body whereby an overhead crane may conveniently lift the loaded body in a simple and effective manner.

My invention will be more fully hereinafter described in relation to the accompanying drawings and the essential characteristics set forth in the claim.

In the drawings Fig. 1 is a side elevation of an automobile truck showing a truck body in position for transportation; Fig. 2 is an end view of the truck body positioned on an automobile truck; Fig. 3 is a plan view of a base framing; Fig. 4 is a side elevation of the fabricated base; Fig. 5 is an elevation of an end frame section; Figs. 6 to 9 are details of the fabricated base; Figs. 10 and 11 are details of a door construction; Figs. 12 and 13 are views on an enlarged scale of the engaging hooks by which the truck body is lifted; Fig. 14 is a side elevation of a detachable wheel; Fig. 15 is an end elevation partly in section of a detachable wheel.

Designating the parts by the use of reference characters and referring particularly to Fig. 1, 10 represents longitudinal beams of an automobile truck, upon which are positioned bolsters 11, extending transversely of the beams 10, and adapted to support a truck body. When in position for transportation on an automobile the truck body rests upon the bolsters 11, and is prevented from longitudinal and transverse movement, with relation to the truck body, by the corner members 12. Referring now to Figs. 3 to 9, in Fig. 3, 20 and 21 represent longitudinal beams, while 22 and 23 are end transverse beams, forming a rectangular frame or base for a truck body. The longitudinal and transverse members are preferably channel members, having the flanges turned inwardly, and are secured together at the ends by angle plates 24, and gusset plates 25. Intermediate the ends of the longitudinal beams are additional transverse members 26, 27 and 28 preferably spaced in such a manner that the members 26 and 28 are directly beneath the lifting hooks, which will be hereinafter described, while the member 27 is preferably positioned across the center of the longitudinal beams. These transverse members 26, 27 and 28 may be I-beams secured to the longitudinal members, on the bottom flanges thereof, by gusset plates 29 and 30. As additional means for securing these transverse members to the longitudinal members, I provide angle plates 31 and 32 securely riveted to the web of the longitudinal channel and to the web of the transverse I-beam. This method of construction is shown in detain in Figs. 8 and 9.

Between the transverse members 26, 27 and 28, I provide reinforcing girders 40 and 41 which are positioned inwardly from the longitudinal beams 20 and 21, a distance substantially equal to one-fourth of the width of the entire base. These girders 40 and 41 are preferably channel members, which are secured to the transverse beams 26, 27 and 28 by gusset plates 42 and 43 securely riveted to the bottom flanges of the channels and I-beams. Intermediate the ends of the girders 40 and 41, I provide stiffening members 44 and 45. The stiffening members comprise channels secured to the girders by angle plates 46 and 47, preferably so positioned, that the flanges of the members 44 and 45 are turned inwardly and face each other. The angle plates 46 and 47 preferably have one leg thereof riveted to the inner face of the web on the girders, while the other leg may be united to the outer face of the web on the stiffening channels. Secured to the transverse beams 22 and 23, and projecting inwardly therefrom, are angle plates 48 and 49 which serve as supports for a flooring. It will be seen that the top of the angle plates 48 and 49 must be aligned with the top of the I-beams 26, 27 and 28 to provide an even surface for the floor of the truck body.

In Fig. 5 is shown an end framing section comprising the sill 50, posts 51 and 52, the roof truss 53, and the chord 54. These members are preferably angle bars secured together, at the bottom, by a gusset plate 55 and, at the top, by a gusset plate 56. An end framing section is adapted to be positioned on each end of the truck body. The lower end of the framing section is adapted to be riveted to the fabricated base, heretofore described, while the top of the section is adapted to support a waterproof roof. I prefer to have a doorway at each end of the body, and to this end I arrange the angles 50, 51, 52 and 54 so that one leg of the respective angle lies in the same plane, while the other leg is so positioned that a door inserted in the end section will be held against any vertical or lateral movement therein.

A frame section, in which a door can be inserted is provided for each side of the body. This section may be of substantially the same construction as is used for the door in the end of the body.

The sides of the body may be constructed of any tongue and groove siding or similar material securely held by angle plates 60 at the corners of the body, while the space on the ends of the body between the door and the sides may be constructed of similar material. I desire to utilize any material that will provide a waterproof structure, and at the same time have sufficient strength and rigidity to withstand impact of the body against a stationary object, such for example, as the post of a building.

The doors of the truck body, as shown in Figs. 1, 2, 10 and 11, comprise units which can be conveniently handled by one or two men. I have shown the doors as being inserted with two units to a section, and have shown a door at one end of the body with a door on each side thereof. To provide a rigid door I prefer to use tongue and groove material 65 as shown in Fig. 11, the ends of the material being protected by angle plates 66 and 67. To protect the edges of each door, the angle plates 66 and 67 are so arranged that one leg of each angle is adjacent the side of the door, while the other leg is in abutting engagement with the edge of the door. At the top and bottom of each door I provide angle plates 68 which may be secured to the angle plate 66, with a gusset plate 69, by bolts or rivets. As shown in Fig. 1, I may provide suitable handles 70 for moving the doors in and out of position.

To retain the doors within the doorway, I provide a pair of Z-bars 71 and 72, which extend across the top and bottom respectively of each doorway and which are so positioned that one flange of each bar is secured to the wall of the body while the other flange abuts and retains the doors in position. The top Z-bar has the last mentioned flange extending downwardly, while the bottom Z-bar has a similarly disposed flange extending upwardly. To insert the doors in position, the top of the door is placed between the outer flange of the top Z-bar and the wall of the body, and the door is then raised until the bottom clears the top edge on the lower Z-bar, whereupon the door is forced inwardly and then permitted to drop into the space provided within the lower Z-bar. The outer flanges on the respective bars are preferably unequal in length so that when the door rests on the bottom bar, the top of the door will be prevented from moving outwardly with relation to the body wall by the outer flange on the upper bar. After the doors are inserted in the casing, I provide a simple and effective means for holding them, which may comprise a bar 73, held in position by the slotted plates 74 and 75. These slotted plates may be riveted to the posts of the door frame and may have a portion thereof extending outwardly from the frame, through which the channel bar may be inserted. The channel bar is preferably positioned with the flanges projecting inwardly and in abutting engagement with outer surface of the doors. To prevent the channel bar from sliding out of position, I provide a projection 76, which serves as a stop and limits the movement of the channel bar in one direction, while movement in the opposite direction is prevented by a hook member 77, which is adapted to be passed through an opening 78 in the channel bar. The hook 77 is so constructed that an ordinary car seal may be inserted across the mouth thereof.

It will be noted that the type of body described may be readily placed on and removed from a truck. To facilitate removal I may provide hooks 80, which are secured to the sides of the body and project upwardly from the eaves thereof. These hooks may comprise a single piece of material rolled or forged to provide a hook portion 80 and a shank 81, which extends from the bottom to the top of the body. They are preferably positioned directly above the ends of the transverse members 26 and 28 of the fabricated base, so that any vertical stress resulting from lifting a loaded body, will be transmitted and distributed to the base. To reinforce the sides of the body I provide the struts 82 and 83 which are secured to the angle plates 84 and 85. In Fig. 1 I have shown the door and engaging means as being positioned on one side of the body, but it is to be understood that the opposite side may be constructed in the same manner.

The floor and roof may be of any standard type of construction, such as is used in railroad box car work, but as shown in Fig. 8, I prefer to have the top of the floor 90 aligned with the top flange of the longitudinal channels 20 and 21. Removably secured to the bottom of the truck body I may provide wheels 100, supported in bearings by brackets 101, which may be secured to the longitudinal base beams 20 and 21 by a pivot 102. As shown in Fig. 15, I provide the shaft 103 rigidly secured to the bracket 101 on which is rotatably mounted the wheel 100. A suitable lubricating means is provided within the plate 104 rigidly secured to the wheel 100.

It will be seen that I have provided a truck body adapted to be used in freight transportation systems, wherein the freight is to be moved from one terminal station to another station in the immediate vicinity. My invention enables a loaded body to be conveniently lifted from a station platform and transferred to an automobile truck without distortion or buckling. The doors may be quickly inserted in position and sealed with the standard car seal.

Having thus described my invention, I claim:

The combination with a container having a base, four side walls and a roof, of vertically extending straps having the lower ends thereof secured to the base, and having the intermediate portions thereof attached to the side walls, there being two of said straps on each side of the container, outwardly facing hooks integral with said straps and projecting above the eaves of said roof, plates attached to the side walls and disposed intermediate the walls and straps adjacent the top portions thereof, and inclined struts having the upper ends thereof rigidly connected to said plates and the lower ends thereof attached to said base, whereby the load may be supported at concentrated points from the hook members and be distributed uniformly over said base.

In testimony whereof, I hereunto affix my signature.

BENJAMIN F. FITCH.